US007860298B2

(12) United States Patent
Leikas et al.

(10) Patent No.: US 7,860,298 B2
(45) Date of Patent: Dec. 28, 2010

(54) METHOD AND SYSTEM FOR THE CALIBRATION OF A COMPUTER VISION SYSTEM

(75) Inventors: Esa Leikas, Espoo (FI); Henrik Haggrén, Espoo (FI)

(73) Assignee: Mapvision Oy Ltd., Espoo (FI)

(*) Notice: Subject to any disclaimer, the term of this patent is extended or adjusted under 35 U.S.C. 154(b) by 796 days.

(21) Appl. No.: 10/496,346

(22) PCT Filed: Nov. 20, 2002

(86) PCT No.: PCT/FI02/00929

§ 371 (c)(1),
(2), (4) Date: Jan. 26, 2005

(87) PCT Pub. No.: WO03/044458

PCT Pub. Date: May 30, 2003

(65) Prior Publication Data

US 2005/0123188 A1    Jun. 9, 2005

(30) Foreign Application Priority Data

Nov. 23, 2001   (FI)   ................................. 20012296

(51) Int. Cl.
*G06K 9/00* (2006.01)
(52) U.S. Cl. ...................... 382/154; 382/293
(58) Field of Classification Search ................ 382/154
See application file for complete search history.

(56) References Cited

U.S. PATENT DOCUMENTS

| | | | |
|---|---|---|---|
| 4,639,878 A | | 1/1987 | Day et al. |
| 4,738,025 A * | | 4/1988 | Arnold .......................... 29/834 |
| 4,841,460 A * | | 6/1989 | Dewar et al. ................... 702/95 |
| 4,964,722 A * | | 10/1990 | Schumacher ........... 356/139.03 |
| 5,606,627 A * | | 2/1997 | Kuo ............................. 382/154 |
| 5,699,444 A * | | 12/1997 | Palm ........................... 382/106 |
| 5,748,505 A * | | 5/1998 | Greer .......................... 702/104 |
| 5,751,843 A * | | 5/1998 | Maggioni et al. ............ 382/154 |
| 5,768,443 A | | 6/1998 | Michael et al. |
| 5,796,386 A * | | 8/1998 | Lipscomb et al. ............ 345/156 |
| 5,816,096 A * | | 10/1998 | Ng et al. ....................... 73/1.79 |
| 5,870,220 A * | | 2/1999 | Migdal et al. ............. 359/216.1 |
| 5,960,125 A * | | 9/1999 | Michael et al. .............. 382/294 |
| 5,978,521 A * | | 11/1999 | Wallack et al. .............. 382/294 |
| 6,064,759 A * | | 5/2000 | Buckley et al. ............. 382/154 |
| 6,081,273 A * | | 6/2000 | Weng et al. .................. 345/420 |
| 6,084,979 A * | | 7/2000 | Kanade et al. .............. 382/154 |
| 6,128,405 A * | | 10/2000 | Fujii ........................... 382/154 |
| 6,363,169 B1 * | | 3/2002 | Ritter et al. ................. 382/154 |

(Continued)

FOREIGN PATENT DOCUMENTS

DE            195 25 561          1/1996

(Continued)

*Primary Examiner*—Sath V Perungavoor
(74) *Attorney, Agent, or Firm*—Frommer Lawrence & Haug LLP; Ronald R. Santucci

(57) ABSTRACT

The invention relates to the calibration of a three-dimensional computer vision system. The method and system are implemented using a polygonal plate-like calibration piece (21) made of a material whose properties do not change significantly with changes in conditions or with time. The edges of the calibration piece (21) used have different lengths and the piece is provided with circular focusing marks (22) placed at its vertices.

16 Claims, 2 Drawing Sheets

U.S. PATENT DOCUMENTS

Figure 1:
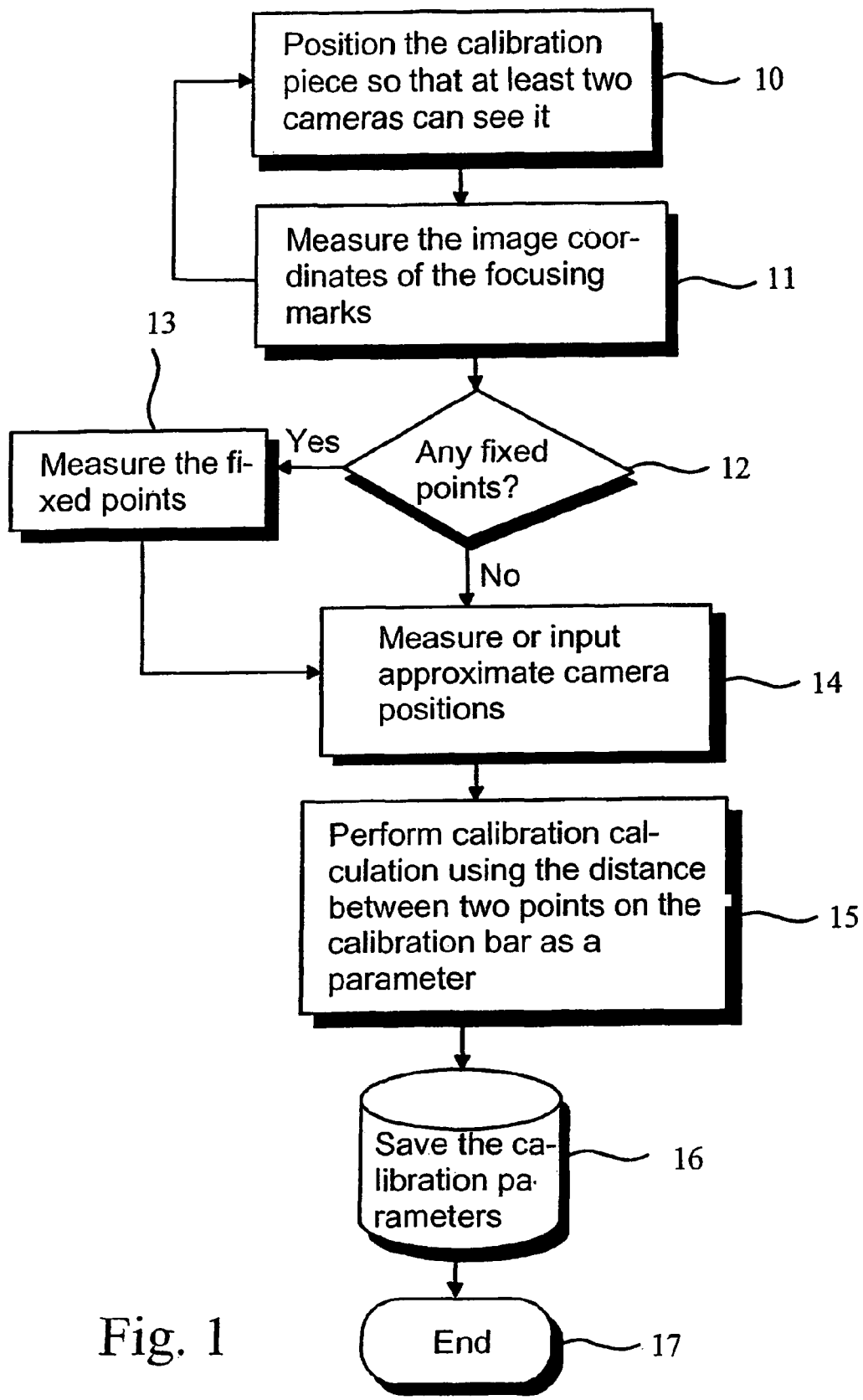

| | | | |
|---|---|---|---|
| 6,728,582 B1 * | 4/2004 | Wallack .................... | 700/64 |
| 7,046,838 B1 * | 5/2006 | Sakagawa et al. ........... | 382/154 |
| 7,751,589 B2 * | 7/2010 | Bovyrin et al. ............ | 382/103 |
| 2002/0041383 A1 * | 4/2002 | Lewis et al. ................ | 358/1.9 |
| 2002/0061130 A1 * | 5/2002 | Kirk et al. .................. | 382/154 |
| 2002/0082498 A1 | 6/2002 | Wendt et al. | |
| 2004/0022439 A1 * | 2/2004 | Beardsley ................... | 382/224 |
| 2004/0202364 A1 * | 10/2004 | Otani et al. ................ | 382/154 |
| 2004/0234122 A1 * | 11/2004 | Kochi et al. ................ | 382/154 |
| 2005/0123188 A1 * | 6/2005 | Leikas et al. ............... | 382/154 |

FOREIGN PATENT DOCUMENTS

| | | |
|---|---|---|
| EP | 0 902 395 | 3/1999 |
| EP | 1 091 186 | 4/2001 |
| FI | 74556 | 5/1990 |
| WO | WO 95/34044 | 12/1995 |
| WO | WO 02/13140 | 2/2002 |

* cited by examiner

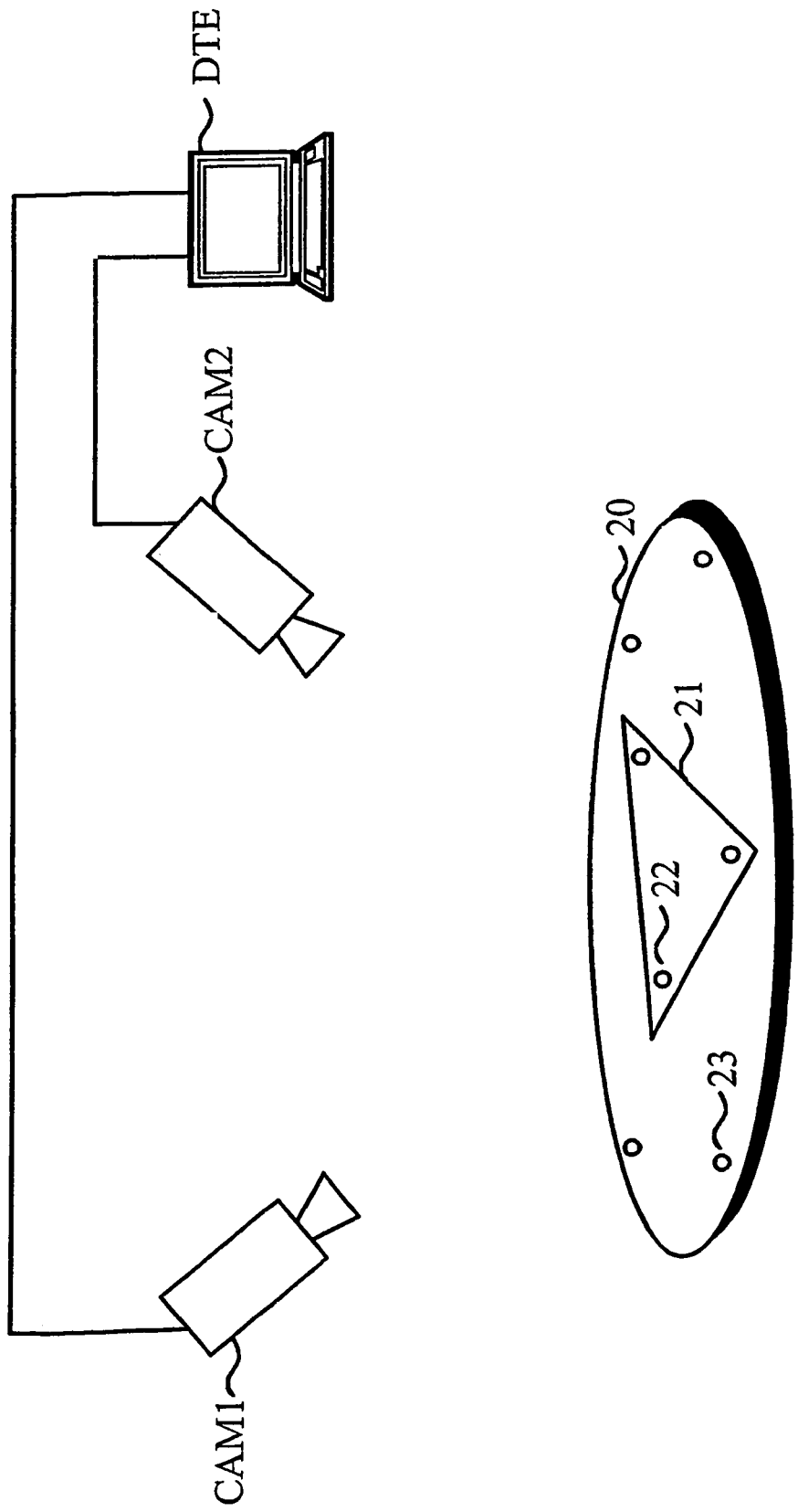

METHOD AND SYSTEM FOR THE CALIBRATION OF A COMPUTER VISION SYSTEM

This application is a 371 of PCT/FI02/00929 filed on Nov. 20, 2002, published on May 30, 2003 under publication number WO 03/044458 A1 which claims priority benefits from Finnish patent application number FI 20012296 filed Nov. 23, 2001.

FIELD OF THE INVENTION

The present invention relates to three-dimensional camera measurement. The present invention concerns a method and system for the calibration of a computer vision system by using a calibration piece.

BACKGROUND OF THE INVENTION

Computer vision systems are based on information obtained from various measuring devices. Information can be measured using e.g. a laser device, a measuring head or via recognition from an image. The information obtained can be utilized e.g. in quality control systems, where, on the basis of this information, it is possible to determine e.g. the correctness of shape of an object, coloring errors or the number of knots in sawn timber.

A computer vision system is generally formed from cameras. Traditional computer vision systems comprised only one camera, which took a picture of the object. By processing the picture, various conclusions could be drawn from it. By using different algorithms, it is possible to distinguish different levels in images on the basis of their borderlines. The borderlines are identified on the basis of intensity conversion. Another method of recognizing shapes in an image is to connect it to masks and filters so that only certain types of points will be distinguished from the image. The patterns formed by the points in the image can be compared to models in a database and thus recognized.

In a truly three-dimensional computer vision system, several cameras are needed. To determine a three-dimensional coordinate, an image of the same point is needed from at least two cameras. The points are usually formed on the surface of the object via illumination. The illumination is typically implemented using a laser. The point is imaged by cameras calibrated in the same coordinate system. When an image of the point can be produced by at least two cameras, it is possible to determine three-dimensional coordinates for the point. For the same position, a number of points are measured. The set of points thus formed is called a point cloud.

The object to be measured can be placed on a movable support, e.g. a rotating table. 'Rotating table' means a support that rotates about its axis. If the object can be rotated, then the camera system need not be able to measure the entire object from one position and normally fewer cameras are needed than when measurements are carried out with the object on a fixed support. The movable support may also be a carrier moving on rails.

To carry out measurements, the computer vision system has to be calibrated because the positions of the cameras or the lens error parameters are not known. Calibration refers to an operation whereby the connected between the two-dimensional image coordinates of the points as perceived by the cameras and the three-dimensional coordinates obtained as a result are determined.

Camera systems are typically calibrated by measuring calibration points in the visual field of the cameras and using calibration pieces comprising a number of three-dimensional points. A calibration procedure is described in Finnish patent no. 74556. The accuracy requirements concerning camera systems and calibration vary depending on the application. The calibration of a camera system is a problem of nonlinear nature, so the mathematical models behind it are complicated, e.g. because of lens errors. Different calibration methods are described e.g. in an article entitled "Geometric Camera Calibration Using Circular Control Points" in the October 2000 issue of the periodical "IEEE Transactions On Pattern Analysis And Machine Intelligence".

Complicated mathematical models are difficult to manage. On the other hand, simplifying the models too much impairs the calibration accuracy. Moreover, in most methods it is assumed that the views perceived by the cameras are unbiased and that the only error appearing in them is the evenly distributed random noise. These problems can be reduced by modifying the mathematical model, but typically this leads to a more complicated model or excessive deterioration of accuracy. However, lens errors and other sources of error inherent with the camera can not be completely eliminated.

OBJECT OF THE INVENTION

The object of the invention is to eliminate the above-mentioned drawbacks or at least to significantly alleviate them. A specific object of the invention is to disclose a new type of method and system for calibrating a computer vision system, thereby eliminating the need for laborious three-dimensional calibration measurements or complicated and expensive calibration pieces.

BRIEF DESCRIPTION OF THE INVENTION

The present invention concerns a method and a system for calibrating a computer vision system. The system consists of cameras, a calibration piece, a support plate and a data system.

The system of the invention is based on a calibration piece provided with focusing marks. The focusing marks are ordinary two-dimensional marks on the surface of the calibration piece. Typical focusing marks used consist of circles. The calibration piece need not comprise any specific three-dimensional shapes. The distance between at least two focusing marks on the calibration piece is measured as precisely as possible. However, more important than measuring precision is that the distance between the focusing marks should remain unchanged during calibration, because the absolute distance between the marks can anyway be controlled after calibration. If necessary, several calibration pieces may be used in the same calibration operation or the distance between the focusing marks can be adjusted by means of a mechanism resembling a micrometer screw, but this imposes great requirements on the calibration pieces to ensure that they always represent the same scale to be traced. In principle, it is sufficient to define the distance between two points by any method during calibration, but in practice a simple way is to use a calibration piece. To ensure that the distance between the focusing marks remains unchanged, the calibration piece is made of e.g. carbon fiber, invar metal or some other material having a good retention of properties. The calibration piece is typically shaped like a bar, but especially a calibration piece with several focusing marks may also have a polygonal shape. It is not necessary to know the distances between all focusing marks on the calibration piece, but at least one distance has to be known. This distance alone or together with other known distances between focusing marks on the calibration piece determines the scale of the system to be calibrated. In calibration according to this method, it is possible to define all conversion parameters except the scale from two-dimensional to three-dimensional and vice versa exclusively on the basis of individual common points seen by the cameras. Calibration performed without even one of the distances makes it possible to determine the shape and internal dimensions of an object, but its absolute size will remain unknown.

The mathematical minimum number of calibration points is five, but in practice, e.g. for the determination of lens errors, more calibration points are needed. Furthermore, the distance between at least two of all the points must be known, but in practice, even so it is advantageous to know more than one distance. In a typical calibration situation, the calibration piece is placed on a support plate so that at least two cameras can see it. Next, the two-dimensional image coordinates of the focusing marks are measured. This step is repeated by moving the calibration piece to several different positions. In their basic form, calibration measurements only comprise these steps, but it is possible to add several other steps to the calibration procedure. For example, if fixed calibration points have been added to the system in order to determine the directions of coordinate axes, those points are measured as well. Instead of circular marks, it is also possible to use other marks. In many cases, individual points are measured whose mutual distances are unknown but which, if seen simultaneously by several cameras, are useful in the determination of the mutual positions and lens errors of the cameras. Focusing marks may also be placed on surfaces known to be planar, in which case the information regarding the positions of the points on the plane can be utilized in the calibration calculation. The calibration points need not consist of focusing marks; instead, they may be e.g. light spots.

After all the measurements of calibration points with the cameras have been made, calibration calculation is carried out. In this calculation, parameters pertaining to the camera system are determined, such as e.g. the mutual positions of the cameras in space and the magnitude of lens errors. As appears from the above description, the essential initial information required only comprises the two-dimensional image coordinates of focusing marks simultaneously seen by the cameras. After this, if desirable, the camera positions may be measured or input with a reasonable accuracy. In the calibration calculation, the scale of the space seen by the cameras is calculated from the three-dimensional distance between at least two points on the calibration piece. Finally, the calibration parameters are saved in memory. Fixed calibration pieces attached to the support can be utilized in fast re-calibration. If necessary, re-calibration can be arranged to be carried out automatically in connection with the actual measurement.

The invention facilitates the calibration of three-dimensional machine vision systems. Using the invention, machine vision systems can be calibrated without complicated mathematical procedures. In the method of the invention, the system is calibrated without any reference pieces containing three-dimensional points or any previously measured three-dimensional points, the placement or measurement of which is in many cases difficult and expensive, if not even impossible. In addition, calibration of a machine vision system performed using a calibration piece according to the invention is a fast operation.

LIST OF FIGURES

In the following, the invention will be described in detail with reference to embodiment examples, wherein FIG. 1 presents a functional diagram representing the method of the invention, and FIG. 2 presents an embodiment of the system of the invention.

DETAILED DESCRIPTION OF THE INVENTION

FIG. 1 presents a diagram visualizing the operation of a method according to a preferred embodiment of the invention. At the beginning of the measurement, a calibration piece is placed on a support plate, step 10. The calibration piece is so positioned on the plate that at least two cameras can see it. Calibration is started by measuring the focusing marks on the calibration piece, step 11. In this example, the focusing marks are circles drawn on the surface of the plate-like piece. When the focusing marks are measured with the cameras, they appear as ellipses unless the camera is positioned perpendicularly above the focusing mark.

After the image coordinates of the focusing marks have been measured, using the calibration piece in several positions if required, other objects can also be measured if necessary, e.g. fixed calibration points mounted on the support plate, step 12. The fixed calibration points are utilized in recalibrations, which are arranged to be carried out automatically if necessary. If fixed calibration points have been mounted on the support plate, they are measured, step 13.

After the measurement of the points, approximate camera positions are often measured as this allows simpler and faster calibration calculation. The camera positions can be measured or input into the system, step 14. The positions need not be accurately determined; instead, approximate determination is sufficient.

After all the required values have been measured or input into the system, calibration calculation is performed using the parameters thus obtained, step 15. Finally, the calibration parameters are stored into the memory of the system.

The system according to FIG. 2 comprises a camera system, which in the example embodiment consists of two cameras CAM1 and CAM2, a calibration piece 21, a support plate 20 and a data system DTE. The calibration piece is provided with focusing marks 22 placed near each corner of it. In addition, fixed calibration points 23 may be placed on the support plate 20.

To implement a three-dimensional computer vision system, at least two cameras CAM1 and CAM2 are needed, but more than two cameras can be used. Typically, four to eight cameras are used. The cameras are connected to the data system, which serves to control the operation of the cameras and perform the actual calibration calculations.

In the calibration system of the invention, a calibration piece 21 is placed on a support plate 20. The calibration piece used here is a polygon in which each edge has a different length. As the edges have different lengths, it is easy to determine the orientational position of the piece because the focusing marks form an unsymmetrical pattern. The focusing marks 22 are placed at the corners of the calibration piece. The focusing marks consist of circular patterns. The distance between the marks has been measured exactly. The marks are placed at the corners 21 of the calibration piece, which is made of special material. A requirement regarding the special material is that it should have invariable properties. The shape of the calibration piece 21 must not change e.g. in consequence of thermal expansion. Suitable materials for making the calibration piece are e.g. invar metal and carbon fiber. The essential point is that the distances between the focusing marks 22 remain constant.

In connection with the calibration, the positions of fixed focusing marks 23 attached to the support plate 20 are determined. The focusing marks are utilized in fast re-calibrations. The system can be re-calibrated automatically, e.g. after a given number of measurements has been reached. Re-calibration is needed e.g. for ascertaining the positions of the cameras and the support plate. However, the distance between the focusing marks 23 placed on the support plate 20 may change with time for one reason or another. Because of this, calibration should be performed again from time to time using a calibration piece.

The invention is not limited to the embodiment examples described above; instead, many variations are possible within the scope of the inventive concept defined in the claims.

The invention claimed is:

1. Method for the calibration of a three-dimensional computer vision system, said method comprising the steps of:
   measuring with cameras calibration points seen by at least two cameras at a time; and
   calculating calibration parameters from points seen by at least two cameras on the basis of their two-dimensional image coordinates,
   wherein the method further comprises the steps of:
   arranging the required calibration points so that the mutual distance between at least two of all the calibration points is known, wherein said mutual distance is used in determining scale of the space;
   measuring the two-dimensional image coordinates of the calibration points by means of the cameras;
   calculating conversion parameters for the conversion of the two-dimensional image coordinates into three-dimensional coordinates and calculating the scale of the three-dimensional coordinate system using at least one known distance in the calibrated space.

2. Method according to claim 1, wherein a calibration piece is used for determining the distances between the calibration points.

3. Method according to claim 1, wherein the method further comprises the steps of:
   calculating the orientational position of the calibration piece in some or all of the locations where it is placed during calibration; and
   the orientational position data is utilized in the calibration calculation.

4. Method according to claim 1, wherein focusing marks consisting of circles are used.

5. Method according to claim 1, wherein the coordinates of focusing marks on a fixed or removable piece mounted in the field of vision of the cameras are measured.

6. Method according to claim 1, wherein the cameras are re-calibrated by using the focusing marks on a fixed or removable piece mounted in the field of vision of the cameras.

7. Method according to claim 1, wherein the known three-dimensional coordinates are converted into two-dimensional image coordinates.

8. System for the calibration of a three-dimensional computer vision system, said system comprising:
   a camera system (CAM1, CAM2);
   a data system (DTE); and
   a support plate (20)
   wherein the system further comprises a planar calibration piece (21), wherein said planar calibration piece comprises calibration points arranged so that the mutual distance between at least two of all the calibration points is known, wherein said mutual distance is used in determining scale of the space for three-dimensional coordinates converted from two-dimensional image coordinates.

9. System according to claim 8, wherein the camera system (CAM1, CAM2) comprises at least two cameras.

10. System according to claim 8, wherein the calibration piece (21) is made of a material whose properties remain constant when the conditions in the measuring environment change.

11. System according to claim 8, wherein the calibration piece (21) is a polygon.

12. System according to claim 11, wherein the edges of the calibration piece (21) have different lengths.

13. System according to claim 8, wherein the calibration piece (21) is provided with focusing marks (22) placed near its vertices.

14. System according to claim 8, wherein the calibration piece (21) is provided with focusing marks (22) placed near its vertices and the mutual geometry of the focusing marks is unsymmetrical.

15. System according to claim 8, wherein the system comprises a fixed or removable piece (23) mounted on the support plate (20) and containing focusing marks.

16. System according to claim 8, wherein the data system (DTE) has been fitted to perform the calibration calculations.

* * * * *